United States Patent
Best et al.

(10) Patent No.: US 10,954,082 B2
(45) Date of Patent: *Mar. 23, 2021

(54) CART COUPLING ASSEMBLY

(71) Applicant: INTELLIGRATED HEADQUARTERS, LLC, Mason, OH (US)

(72) Inventors: Richmond Emory Best, Frederick, MD (US); Mark Kenneth Vegh, Frederick, MD (US)

(73) Assignee: Intelligrated Headquarters, LLC, Mason, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/702,048

(22) Filed: Dec. 3, 2019

(65) Prior Publication Data

US 2020/0109017 A1  Apr. 9, 2020

Related U.S. Application Data

(63) Continuation of application No. 16/105,667, filed on Aug. 20, 2018, now Pat. No. 10,532,895.

(51) Int. Cl.
*B65G 47/96* (2006.01)
*B60D 1/02* (2006.01)
*B60D 1/00* (2006.01)

(52) U.S. Cl.
CPC ............. *B65G 47/962* (2013.01); *B60D 1/02* (2013.01); *B60D 2001/005* (2013.01)

(58) Field of Classification Search
None
See application file for complete search history.

(56) References Cited

U.S. PATENT DOCUMENTS

| 4,002,352 A | 2/1977 | Hager |
| 5,407,061 A | 4/1995 | Okada et al. |
| 5,826,704 A * | 10/1998 | Van Den Goor .... B65G 17/066 198/851 |

(Continued)

FOREIGN PATENT DOCUMENTS

| CN | 200999859 Y | 1/2008 |
| CN | 201472158 U | 5/2010 |

(Continued)

OTHER PUBLICATIONS

Ex Parte Quayle Action Mailed on Jun. 27, 2019 for U.S. Appl. No. 16/105,667.

(Continued)

*Primary Examiner* — William R Harp
(74) *Attorney, Agent, or Firm* — Alston & Bird LLP

(57) ABSTRACT

Various embodiments described herein, relates to a sortation conveyer system comprising a cart coupling assembly for coupling two adjacent carts. The cart coupling assembly includes a coupling disc having: (a) a control slot, (b) a bearing slot, and (c) one or more arcuately shaped mounting slots. The coupling disc is mounted on a cart such that, upon rotation of the coupling disc, a control slot cavity defined by the control slot slid ably moves about a position register screw along the control slot cavity and a cavity defined by a respective mounting slot slid ably moves relative to a respective mounting pin received in the mounting slot.

20 Claims, 8 Drawing Sheets

(56) References Cited

U.S. PATENT DOCUMENTS

| | | |
|---|---|---|
| 6,367,610 B1 | 4/2002 | Fortenbery |
| 6,736,254 B1 | 5/2004 | Fortenbery et al. |
| 6,899,217 B1 | 5/2005 | Fortenbery et al. |
| 7,611,007 B2 * | 11/2009 | Lim .................... B65G 17/066 198/850 |
| 8,985,310 B2 | 3/2015 | Heitplatz |
| 9,233,803 B2 | 1/2016 | Pilarz et al. |
| 9,376,271 B2 | 6/2016 | Fujio et al. |
| 10,532,895 B1 * | 1/2020 | Best .................... B65G 17/345 |
| 2014/0014468 A1 | 1/2014 | Nolan et al. |

FOREIGN PATENT DOCUMENTS

| | | |
|---|---|---|
| CN | 105829750 A | 8/2016 |
| DE | 202004012251 U1 | 9/2004 |
| EP | 2505860 A2 | 10/2012 |
| WO | 2017/092763 A1 | 6/2017 |

OTHER PUBLICATIONS

Notice of Allowance and Fees Due (PTOL-85) dated Sep. 10, 2019 for U.S. Appl. No. 16/105,667.
Search Report for British Application No. 1911697.9, dated Feb. 6, 2020, 4 pages.
Office Action issued in Chinese Application No. 201910690588.0 dated Jan. 5, 2021, 6 pages.

\* cited by examiner

800

ENGAGING A FIRST CART OF THE CART ASSEMBLY WITH A SECOND CART OF THE CART ASSEMBLY, VIA A CART COUPLE ASSEMBLY, WHERE THE CART COUPLING ASSEMBLY COMPRISES A COUPLING DISC HAVING, A CONTROL SLOT WITH A LEAST ONE POSITION REGISTER, AND A BEARING SLOT CONFIGURED TO HOLD A BEARING THAT ENGAGES A BEARING HUB ASSEMBLY ON AN END OF THE SECOND CART, AND ONE OR MORE MOUNTING SLOTS ; — 802

ROTATING, THE COUPLING DISC IN A SECOND DIRECTION WITH RESPECT TO THE FIRST CART AND ABOUT A CENTER AXIS OF THE COUPLING DISC, WHERE THE ROTATION OF THE COUPLING DISC CAUSES A SLIDING MOVEMENT OF A CONTROL SLOT CAVITY RELATIVE TO A POSITION REGISTER SCREW ALONG THE CIRCULAR CONTROL SLOT CAVITY OF THE CONTROL SLOT AND SLIDING MOVEMENT OF THE ONE OR MORE MOUNTING SLOTS RELATIVE TO A RESPECTIVE MOUNTING PIN IN EACH OF THE ONE OR MORE MOUNTING SLOTS, IN A SECOND DIRECTION — 804

PAUSING, THE ROTATION OF THE COUPLING DISC, BASED ON A LOCKING OF THE POSITION REGISTER SCREW, BY THE AT LEAST ONE POSITION REGISTER AS THE CONTROL SLOT CAVITY SLID ABLY MOVES RELATIVE TO THE POSITION REGISTER SCREW ALONG THE CONTROL SLOT CAVITY, WHERE THE POSITION REGISTER IS CONFIGURED TO LOCK THE POSITION REGISTER SCREW TO RESTRICT A SLIDING MOVEMENT OF THE CONTROL SLOT CAVITY RELATIVE TO THE POSITION REGISTER SCREW IN A FIRST DIRECTION OPPOSITE TO THE SECOND DIRECTION, THEREBY RESTRICTING THE ROTATION OF THE COUPLING DISC IN THE FIRST DIRECTION — 806

*FIG. 8*

CART COUPLING ASSEMBLY

CROSS-REFERENCE TO RELATED APPLICATIONS

This application is a continuation application of and claims the benefit of priority to U.S. application Ser. No. 16/105,667 entitled "CART COUPLING ASSEMBLY" filed on Aug. 20, 2018, the entirety of which is incorporated by reference herein.

BACKGROUND

Technical Field

The present disclosure generally relates to sortation conveyors that sort discrete articles to one of multiple destinations, and more specifically a cart coupling assembly used in a sorter cart train.

Description of the Related Art

A distribution center for a set of products is a warehouse or other specialized building that is stocked with products (goods) to be redistributed to retailers, to wholesalers, or directly to consumers. A distribution center is a principal part, order processing element, of an entire order fulfillment process. A distribution center can also be called a warehouse, a DC, a fulfillment center, a cross-dock facility, a bulk break center, and a package handling center. The name by which the distribution center is known is commonly based on the purpose of the operation. For example, a "retail distribution center" normally distributes goods to retail stores, an "order fulfillment center" commonly distributes goods directly to consumers, and a "cross-dock facility" stores little or no product but distributes goods to other destinations. Some organizations operate both retail distribution and direct-to-consumer out of a single facility, sharing space, equipment, labor resources, and inventory as applicable.

Distribution centers are the foundation of a supply network, allowing a single location to stock a vast number of products. A large retailer might sell tens of thousands of products from thousands of vendors. Sortation conveyors are an important aspect of distribution centers (DCs). Typically, goods are received in bulk and need to be immediately or eventually routed to one or more different storage or shipping locations within the DC. The sortation conveyor receives a singulated stream of articles, such as parcels, cartons, totes, shrink wrapped products, bags, etc. The individual articles are identified and a particular divert destination, selected from multiple divert destinations, is assigned to each article. In many instances, the divert destination is a conveyor, chute, Gaylord or other apparatus that can receive and accumulate a number of articles that constitute an order for shipping to a specific recipient. The accumulated order can then be moved to a transportation conveyance.

Without prejudice to above identified problems, Applicant has identified a number of deficiencies and problems associated with the foregoing. Through applied effort, ingenuity, and innovation, many of these identified problems have been solved by developing solutions that are included in embodiments of the present invention, many examples of which are described in detail herein.

BRIEF SUMMARY

Various embodiments described herein, relates to a mechanism for coupling multiple linked carts in a sortation conveyor system. In an embodiment, the sortation conveyor system includes at least one cart coupling assembly that is adapted to engage two adjacent carts. The cart coupling assembly includes: (i) a coupling disc that is configured to engage a first cart with an adjacent cart. In this regard, a structure of the coupling disc includes a control slot having one or more position registers defined along a control slot cavity of the control slot. The one or more position registers, herein, are configured to engage and lock, a position register screw, to restrict a sliding movement of the control slot cavity relative to the position register screw along the control slot cavity of the control slot, in a first direction, in an instance, while the coupling disc rotates. Further, the one or more position registers, herein, are also configured to allow sliding movement of the control slot cavity relative to the position register screw in a second direction opposite to the first direction along the control slot cavity of the control slot, in an instance, while the coupling disc rotates. The coupling disc, as described herein, also includes multiple mounting slots and a bearing slot. In this aspect, the bearing slot is adapted to hold a bearing and is located circumferentially at a center of the coupling disc. The bearing, herein, is configured to engage a bearing hub assembly of a second cart that may be positioned adjacent to the first cart. The cart coupling assembly further includes, (ii) a set of mounting pins attached at an end of the first cart. In accordance with said embodiment, as the coupling disc is engaged on the first cart, the control slot is configured to receive the position register screw and each mounting slot is configured to receive one of the mounting pins. Further, in this aspect, when the coupling disc rotates, the control slot and each of the mounting slots, slide on each respective one of, the position register screw and the set of mounting pins. In this regard, upon rotation of the coupling disc, the control slot cavity and the mounting slot cavities slid ably moves relative to the position register screw and each mounting pin respectively to produce a translational movement of the bearing. This translation movement of the bearing changes a gap between the first cart and the second cart, as in, when the carts are engaged together, by the cart coupling assembly. To this extent, in accordance with said embodiment, cavities defined by a structure of the control slot and each of the mounting slots respectively, facilitates a continual linear translation of a center of rotation about the bearing of the coupling disc, when the coupling disc is rotated.

According to another embodiment, a system including a plurality of carts on a conveyor, is described. In this regard, at least two carts, from amongst the plurality of carts includes: (i) a front hitch plate mounted on a primal end of the at least two carts and (ii) a rear hitch plate mounted on a distal end of the at least two carts. In accordance with said embodiment, the rear hitch plate also includes a bearing hub assembly. To engage adjacent carts together, the system further includes a cart coupling assembly configured to engage a front plate of one of the at least two carts with the rear hitch plate of another of the at least two carts. In this regard, the cart coupling assembly includes a coupling disc having a control slot with one or more position registers defined along a control slot cavity of the control slot. The one or more position registers, herein, are configured to engage and lock, a position register screw, to restrict a sliding movement of the control slot cavity relative to the position register screw along the control slot cavity in a first direction, in an instance, while the coupling disc rotates. Further, the one or more position registers, herein, are also configured to allow sliding movement of the control slot cavity relative to the position register screw in a second direction opposite to the first direction along the control slot cavity. The coupling disc further includes multiple mounting slots and a bearing slot. In this aspect, the bearing slot is adapted to hold a bearing and is located circumferentially at a center of the coupling disc. In this aspect, the bearing is configured to engage a bearing hub assembly of a second cart adjacent to the first cart. The cart coupling assembly further includes, a set of mounting pins attached at an end of the first cart. In accordance with said embodiment, upon engagement of the coupling disc on the first cart: (a) the control slot is configured to receive the position register screw and (b) each mounting slot is configured to receive one of the mounting pins. Further, in this aspect, in an instance, when the coupling disc rotates, the control slot and each of the mounting slots slide on each respective one of, the position register screw and the set of mounting pins to produce translational movement of the bearing to change a gap between the first cart and the second cart, via the cart coupling assembly.

According to said embodiment, upon engagement of the coupling disc to the first cart, each of the mounting slots of the coupling disc receives one of the respective of mounting pins. In this aspect, the set of mounting pins, as described herein, are engaged on the front hitch plate of the first cart. As the bearing slot of the coupling disc receives the bearing hub assembly on the rear hitch plate of the second cart, the first cart is engaged with the second cart.

According to another embodiment, a method for adjusting length of a cart assembly in a conveyor system, is described. The method includes, engaging a first cart of the cart assembly with a second cart of the cart assembly, via a cart coupling assembly. To this extent, the cart coupling assembly herein, comprises a coupling disc that includes a control slot with at least one position register. The coupling disc also includes, a bearing slot configured to hold a bearing that engages a bearing hub assembly on an end of the second cart. Further, the coupling disc also includes one or more mounting slots. Upon engaging the first cart of the cart assembly with the second cart, the method includes, rotating the coupling disc in a second direction with respect to the first cart and about a center axis of the coupling disc. In this regard, the rotation of the coupling disc provides a sliding movement of a control slot cavity of the control slot relative to a position register screw along the circular control slot cavity of the control slot. Also, rotation of the coupling disc, provides a sliding movement of one or more mounting slot cavities defined by defined by each of the one or more mounting slots respectively, relative to a mounting pin that is received respectively in the one or more mounting slot cavities, in the second direction. Further, upon rotating the coupling disc, the method includes, pausing the rotation of the coupling disc, based on a locking of the position register screw, by the at least one position register as the control slot cavity of the control slot slid ably moves with respect to the position register screw along the control slot cavity. In this regard, the position register is configured to lock the position register screw to restrict a sliding movement of the control slot cavity relative to the position register screw in a first direction opposite to the second direction, thereby restricting the rotation of the coupling disc in the first direction.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 8 illustrates an exemplary flow diagram of a method of operating a coupling assembly, according to one or more embodiments.

DETAILED DESCRIPTION

Figure 1:
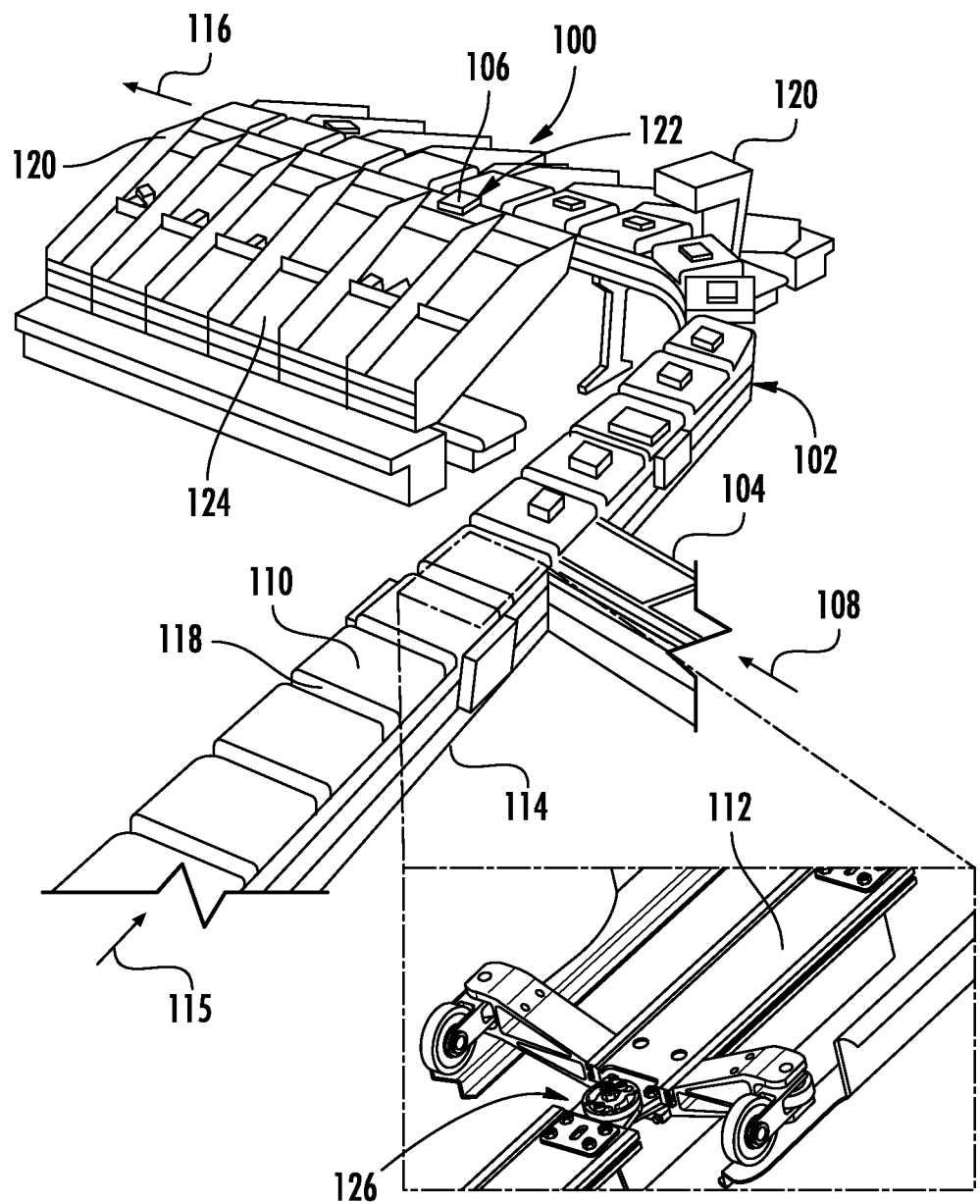
FIG. 1 illustrates a fragmentary partially exploded perspective view of a material handling system including a sortation conveyor comprising multiple coupling disc assemblies connecting multiple carts of the sortation conveyor, according to one or more embodiments.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

An example material handling system includes a sortation conveyor for transporting different articles or products from a source location to a destination location. The sortation conveyor includes a conveyor bed, commonly referred as, conveyor frame in a conveyor system or a sorter frame in the sortation conveyor, on which multiple carts moves along with respective carriers for carrying various items. In this regard, the sortation conveyor, usually comprises, multiple carts (e.g., a cart along with a respective carrier engaged to the cart) that are placed adjacent to each other, in a manner such that, one cart after another of the multiple carts together forms a sorter cart train, which runs on the conveyor bed. The conveyor carts, in some examples, are like totes, carrier buckets or cross belt carriage usually meant for carrying or loading different products or articles from one location, such as a source location to another location, such as a destination location within a distribution center, an inventory store or warehouse unit. In some cases, the sortation conveyor is a loop sortation conveyor that may be installed within the material handling environment, for sorting different articles or products to one of many possible destination locations. In this regard, the loop sortation conveyor (also called as "loop sorter") is a category of sortation equipment having multiple carts sequentially engaged in a cart train that endlessly conveys around a loop formed by a conveyor bed or track. Each cart supports one or more carriers for carrying and discharging articles. In this aspect, depending on an installation, the loop can be designed and installed with a desired length and the loop can also be designed and installed with various changes in lateral and vertical direction to fit within a desired footprint and with other material handling equipment. Typically, in such sortation conveyors, a connection including an engagement means between the carts may securely couple two adjacent carts, as the adjacent carts move through these changes in relative directions. In this aspect, an overall length of the cart train needs to be capable of matching a running length of the loop sorter. Usually, these multiple carts are engaged adjacently to each other by means of various engagement mechanisms.

To this extent, in operation, where such sortation conveyors having multiple carts are adjacently engaged with each other, often, there are undesired-gaps which are created along a sorter cart train of the sortation conveyor, as the carts move operationally for transporting the articles. These gaps are often created due to multiple reasons, like, slack-ups occurred during running of sorter chain that may be due to tensions created along the sorter chain, or variances on floor and the sorter bed on which the sorter is placed, or sometimes during installation of the sortation system itself. For smooth movement and operation of the carts along the sortation conveyor, formation of such gaps is to be minimalized or removed. Further, such gaps along the sortation conveyor increases chances of falling off the articles from the carts or improper diverting of the articles by the sorter. Accordingly, for smooth movement of multiple carts along a sortation system such as, a loop sorter or a tilt-tray sorter, multiple carts are to be effectively installed adjacent to each other over a sorter frame. Error free installation and timely maintenance of installed carts over a sorter frame prevents and resolves, in some examples, any formation of gaps or slacks formed between the carts in a sorter train over an operational period.

According to present invention, systems and methods described herein, relates to a sortation conveyor system comprising one or more carts, that are configured to carry one or more carts holding various items on a conveyor and engagement mechanisms for engaging adjacently placed carts. In this regard, for coupling two adjacent carts together along a conveyor bed, a cart coupling assembly, is described. In accordance with some embodiments, one or more carts of the sortation conveyor system may include a front hitch plate and a rear hitch plate that may be mounted on a front or primal end and a rear or a distal end of each of the cart, respectively. In this regard, the cart coupling assembly, in accordance with various embodiments described herein, includes: a coupling disc, a bearing hub assembly, and a set of mounting pins. To this extent, for engaging two carts together, the coupling disc is mounted on the front hitch plate of the cart and is adapted to receive the bearing hub assembly that is on the rear hitch plate of an adjacent cart. Accordingly, when the two adjacent carts are engaged together, the bearing hub assembly on the rear hitch plate of a first cart is engaged via a bearing slot of the coupling disc on the front hitch plate of a second cart which is positioned adjacent to the first cart.

In accordance with various embodiments described herein, the cart coupling assembly including the coupling disc and the bearing hub assembly, may be installed between each pair of adjacent carts together along a sorter cart train. To this extent, upon engaging the two adjacent carts together, the coupling disc is rotatable in any of a clockwise or counterclockwise direction relative to its center, such that rotation of the coupling disc is performed to adjust distance between two adjacent carts, in order to overcome any gaps that may be formed during an operation of the sortation conveyor.

In accordance with various embodiments described herein, the coupling disc includes a control slot having at least one position register that is defined along a cavity defined by the control slot. Also, the coupling disc includes one or more mounting slots. To this extent, in some embodiments, a lateral surface defined by cavities of each of the control slots and the one or more mounting slots may be of a circular shape. However, in other embodiments, the cavities defined by each of the control slots and the one or more mounting slots may be such that, a curvature defined by these slots is circular and does not changes with respect to a central axis of the coupling disc. In this regard, the rotation of the coupling disc, causes sliding movement of the one or more mounting slot cavities (of respective one or more mounting slots) with respect to a set of mounting pins on an end of a cart and sliding movement of a control slot cavity of the control slot, relative to, a position register screw into the control slot cavity of the control slot. In the control slot, as the coupling disc rotates causing sliding of the control slot cavity about a position register screw and the sliding of the mounting slot cavities relative to one or more mounting pins, the position register, facilitates engaging and locking the position register screw, in such a manner, that an adjustment of a cart length and/or distance between the two carts happens only in one direction, for instance, an upstream direction of the sortation conveyor system or a downstream direction of the sortation conveyor system, at an instance of time. In this aspect, in an instance, when the coupling disc rotates, the control slot and each of the mounting slots slide on each respective one of the position register screw and a set of mounting pins, to produce translational movement of a bearing in the bearing slot of coupling disc, to change a gap between a first cart and a second cart of the sortation conveyor system. Accordingly, in accordance with various example embodiments described herein, a rotational motion of the coupling disc is translated into a linear motion that causes movement or displacement of the coupling disc over the front hitch plate, so as to, adjust the distance between a front end of a cart and a rear end of an adjacent cart.

Accordingly depending on rotation of the coupling disc, an adjustment in the length of the cart may be performed along the sortation conveyor system to overcome formation of any gaps that are formed during an operational course of the sortation conveyor system. Various aspects of the sortation conveyor system including the cart coupling assembly and operations of the cart coupling assembly, are described in more details in reference to description of FIGS. 1-8 hereinafter. Various aspects related to the coupling disc are described herein, with reference to sortation conveyor system, however, the coupling disc may be used in various other application areas for engagement of other mechanical structures, without departing from scope and spirit of described subject matter.

FIG. 1 illustrates a material handling system 100 that includes a sortation conveyor 102 that provides induction of items (for example, articles, cartons, parcels, boxes, products, and/or the like) from different source locations and discharging of the items to a destination location. According to various embodiments illustrated herein, the sortation conveyor 102 may be any of: a cross belt (CB) loop sorter, a tilt tray sorter or a pusher-carriage, or any other sorter type, conventionally known in state of art. As illustrated herein, one or more induction conveyors 104 may transfer articles 106 to respective locations of the sortation conveyor 102, such as inbound direction indicated by arrow 108. The sortation conveyor 102, in this regard, may comprise of multiple carts which runs via rails along a conveyor bed 114 such as, a conveyor frame or a sorter frame. In this regard, multiple cart frames, (also referred herein as carts, hereinafter throughout the description) are covered with a moving carriage or a moving carrier cart, such as a cart 112 that runs along with the carts, via engagement of rails associated with the carts along the conveyor bed 114. Accordingly, for transportation of articles from a source (e.g., inventory location) to a destination (e.g., chutes, a container, downstream conveyors, and/or the like), the articles 106 are positioned on a carriage 110 such as, but not limited to, a cross-belt carriage on the moving carrier cart, such as the cart 112 that endlessly conveys on a conveyor bed 114 in a looping direction indicated by arrow 115. Illustratively, an indicia reader 120 may also be provided along the sortation conveyor 102 to read coded information placed on the articles 106, while the articles 106 are in transit on the sortation conveyor 102.

Illustratively, the sortation conveyor 102, along with transporting the articles 106, may also sort the articles 106, as these articles 106 moves along a length of the sortation conveyor 102. In this aspect, the sortation conveyor may transport the articles 106 into various downstream lanes, for instance, via transfer chutes 122 into different picking units 124. As illustrated, different adjacent carts along the cross-belt carriage 110 may be connected together over an engagement means 118 of respective carts, via a cart coupling assembly 126. Various embodiments with reference to FIGS. 2-8 hereinafter, describe further details of the cart coupling assembly 126 for engaging adjacent carts on a sorter system, like the sortation conveyor 102 as illustrated in FIG. 1.

Figure 2:
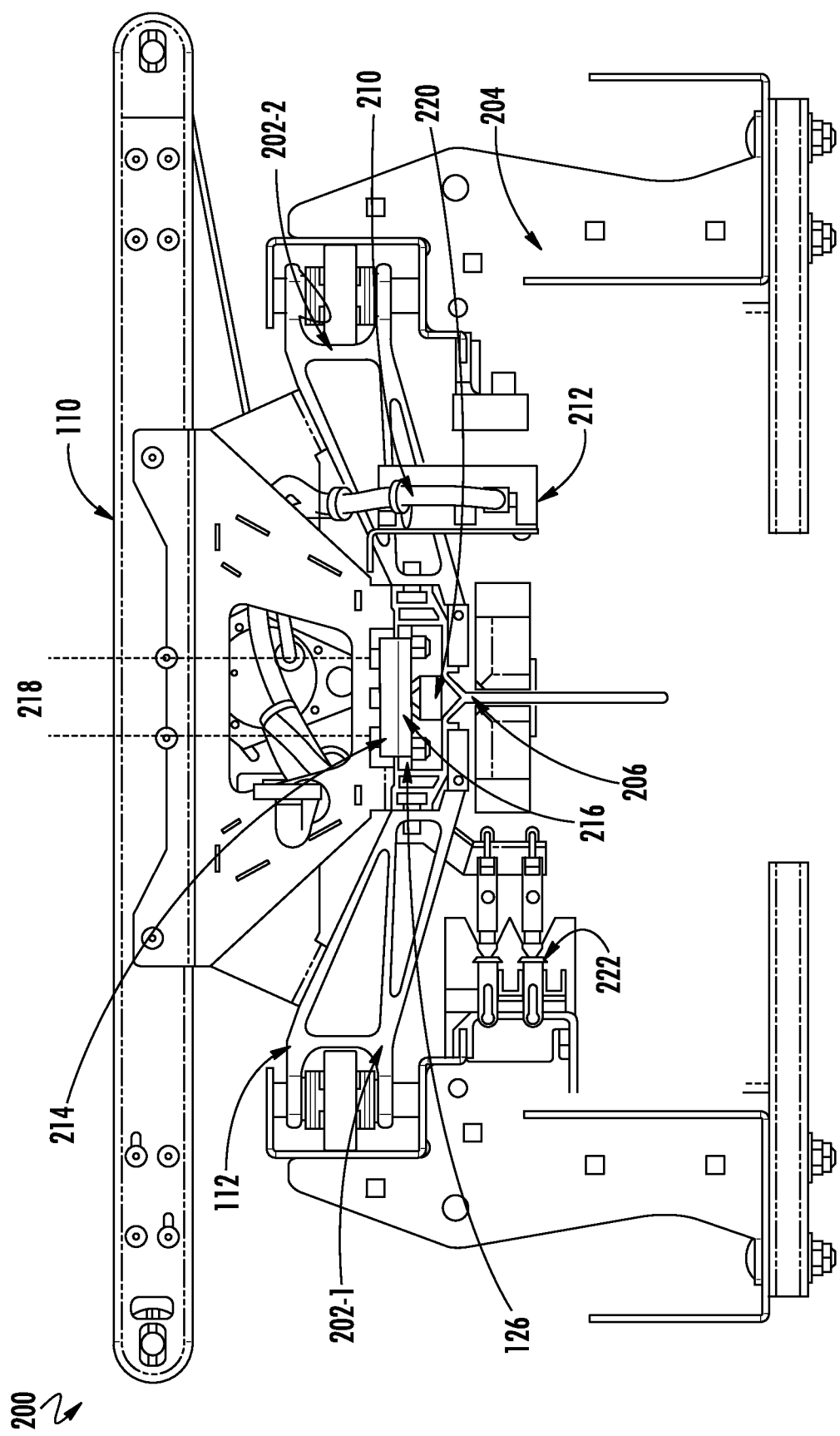
FIGS. 2 and 3 illustrates fragmentary cutaway perspective views of front and back of a sortation system comprising a cart coupling assembly for engaging multiple carts in a sorter cart train, according to one or more exemplary embodiments.

FIG. 2 illustrates fragmentary cutaway perspective views of the front of a sortation conveyor system 200, comprising the cart coupling assembly 126, for engaging adjacent carts, such as the cart 112 and a subsequent cart, of the sortation conveyor 102, as illustrated in FIG. 1. In this regard, the fragmentary cutaway perspective view illustrates a depiction of the cart coupling assembly 126 of one cart from amongst the multiple carts on the sortation conveyor 102, where each of the cart 112, moves along in a direction one after another in a sorter cart train fashion, according to one or more exemplary embodiments. In some examples and in accordance with a front view of the sortation system 200, which provides the cutaway perspective view of the sortation conveyor, a cart would move in a direction outwards of a viewing screen towards a user viewing the FIGS. 2 and 3 upon movement of the sortation conveyor.

In an aspect, the perspective view of the sortation system illustrates a cross-sectional view of a cross belt sorter carrier, such as the cross-belt carriage 110 described in FIG. 1, which on installation of the sortation conveyor 102, sits on a top of the cart 112. In some examples, multiple items may be placed on the cross-belt sorter carrier for transportation from a source location to a destination location by a sorter conveyor train of the sortation system 200. Illustratively, the cart 112, includes two cart arms 202-1 and 202-2, each of which includes a cart wheel assembly (not shown herein) which moves along a conveyor bed frame 204 by means of the respective cart wheel assembly. In this regard, the cart 112 includes a cart frame having a carrier support structure with a longitudinal portion and a transverse portion, such that the longitudinal portion terminates at horizontally-extending front and rear hitch plates (not shown) and the transverse portion terminates in left and right ends connected to wheel assemblies (not shown) for moving the cart along the conveyor bed frame 204. Details of the structure of the cart 112 are described in reference to FIGS. 4 and 5.

In this context, the cart 112 includes a main profile having two cart arms 202-1 and 202-2 which extends outwardly from a cart main profile 206. In operation, the cart main profile 206 maintains a pre-determined distance above a seating or lower end of the conveyor bed frame 204 due to induction maintained by a dual linear induction motor (not shown herein) which runs the carts 112 along the conveyor bed frame 204. As described, in an aspect, the cart 112 includes hitch plates (rear and front hitch plates) at two ends front and back end of a longitudinal portion of the cart 112, for engaging the cart coupling assembly 126 by means of various fastening bolts. Details of the hitch plate and engagement of the cart coupling assembly on the hitch plate of the respective cart 112 is described with respect to FIGS. 4 and 5.

As illustrated, several I/O cables 210 runs through the conveyor bed frame 204, communicating power and control commands from a carrier control card (CCC) (not shown herein) (e.g., a controller unit) for driving various operations of the cart 112. In this regard, each cart 112 of the sortation conveyor 102, in some examples, includes a type of the CCC. The CCC is mounted on each cart and receives instructions from a sortation control card (SCC) for execution of various operations of the cart 112. Illustratively, the CCC provides commands like, 'run', 'discharge', 'induct', etc. for performing various operations like moving in a direction, discharging the articles, etc. by the cart 112.

As illustrated, the cart coupling assembly 126 includes a coupling disc 214 mounted on a mounting plate 216 which is engaged to a main profile of the cart 112. In this regard, the coupling disc 214 is engaged on the mounting plate 216 via one or more mounting pins 218, such that upon engagement of two adjacent carts together, a hitch pin 220 of a bearing hub assembly (not shown herein) of an adjacent cart 112 passes through a bearing slot towards a center of the coupling disc 214. In this regard, for adjusting a distance between two carts, such as the cart 112 and an adjacent cart, the cart coupling disc 126, includes a control slot (not shown herein) for receiving a position register screw (not shown herein) at different positions of the control slot and one or more mounting slots for receiving respective mounting pins 218. To this extent, on rotating the coupling disc, a sliding movement of control slot cavity of a control slot and one or more mounting slot cavities of respective one or more mounting slots defined on the coupling disc 214, relative to the position register screw and the mounting pins 218 respectively happens, thereby causing conversion of rotational motion of the coupling disc into a linear motion. Further, details of the cart coupling assembly 126, including the coupling disc 214, the mounting pins 218, the hitch pin 220, bearing slot, position register screw and the control slot, for engaging adjacent carts together are described with respect to FIGS. 4 and 5.

Figure 3:
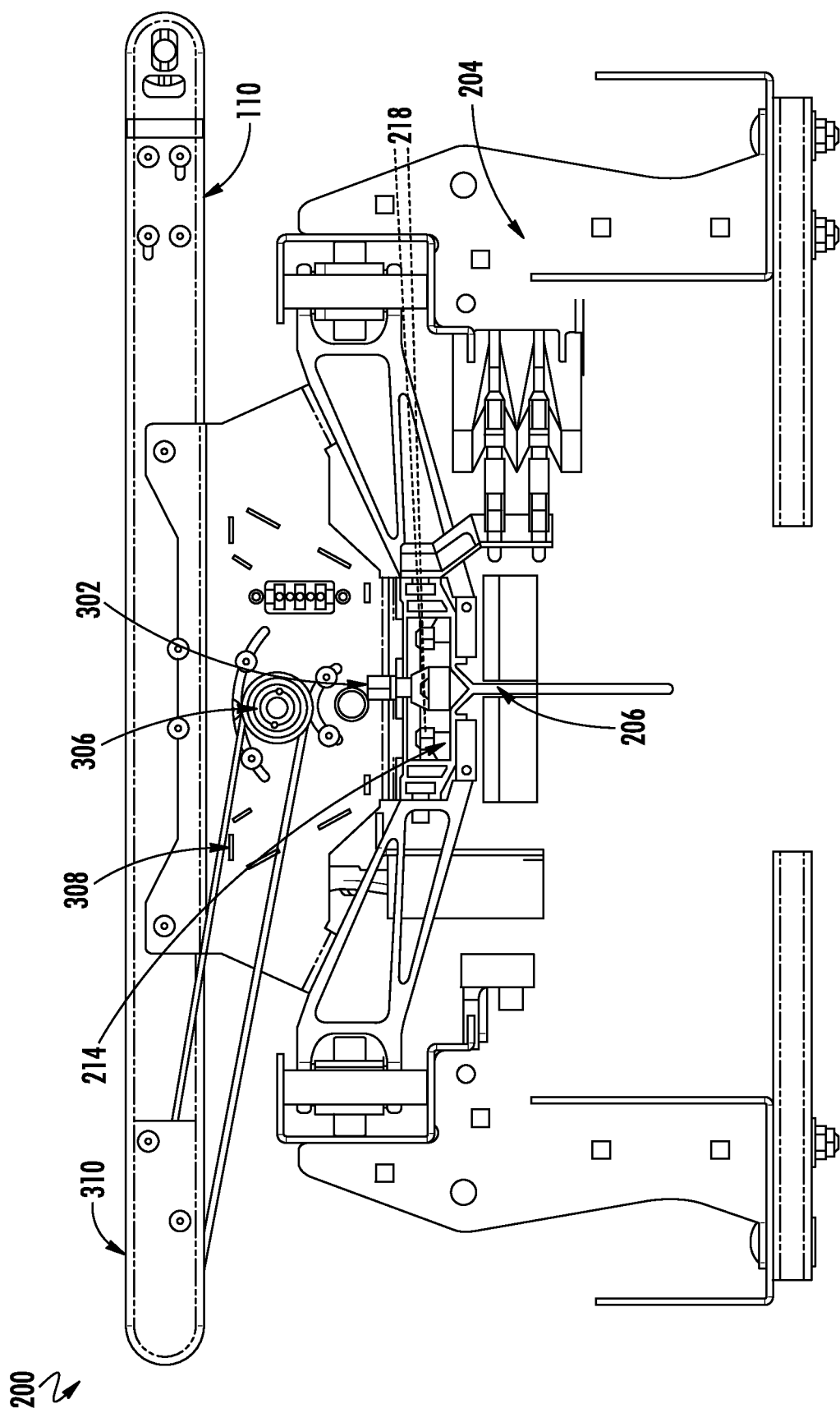

FIG. 3 illustrates a fragmentary cutaway perspective view of a back of a sortation system 200. The illustrated view representing an example embodiment corresponds to a first cart from amongst the multiple carts of the sortation system 200 which may be located at a first end of a sorter cart train. In some examples and in accordance with a back view of the sortation system 200, which provides the cutaway perspective view of the sortation conveyor, cart 112 would move in a direction inwards of a viewing screen away from a user viewing the FIGS. 2 and 3 upon movement of the sortation conveyor.

In this regard, cart coupling assembly 126 in this view, a bearing hub assembly 302 is illustrated, which passes through a central slot, i.e. the bearing slot of the coupling disc 214 for engaging two adjacent carts together in the sortation conveyor 102. In an example embodiment, a sorter control card (SCC) (not shown herein) of the sortation conveyor 102 is illustrated which may be positioned near conveyor bed frame 204 and may be communicatively connected to the dual-linear induction motor. In this aspect, the SCC provides power and control commands to the CCC for controlling a movement of the sortation conveyor 102. The SCC in this aspect is communicatively coupled to a dual induction linear motor (not shown herein) and controls a distribution of power generated by the dual linear induction motor. In this regard, the power generated by the dual induction linear motor is daisy chained out by means of conductor rails (CR) available at each of the conveyor bed frame 204, into different carts positioned one after another in the sorter cart train. As illustrated, a motor timing gear 306 is connected via a timing belt 308 to a timing gear 310 of a driving roller of the sortation conveyor 102. The motor timing gear 306 controls a speed of motion of each of the cart 112 in the sortation conveyor 102, depending upon a power generated by the dual linear induction motor. The back of the sortation system 200, as illustrated, also provides a view of Dlim inlet transition slots (not shown herein) which are present on the conveyor bed frame 204 and provides channeling and a protection fin of the cart main profile 206, to protect the system in case the fin gets damaged or twisted, due to induction generated by the dual linear induction motor.

FIGS. 2 and 3 as described herein illustrate an example perspective view of a cross section (e.g., a fragmented cut away view of the sortation conveyor) in an instance in which the cart coupling assembly 126 is installed for engaging two adjacent carts together in the sortation system. The structure and operations of the cart coupling assembly 126 are described in more detail with respect to FIGS. 4-8.

Figure 4:
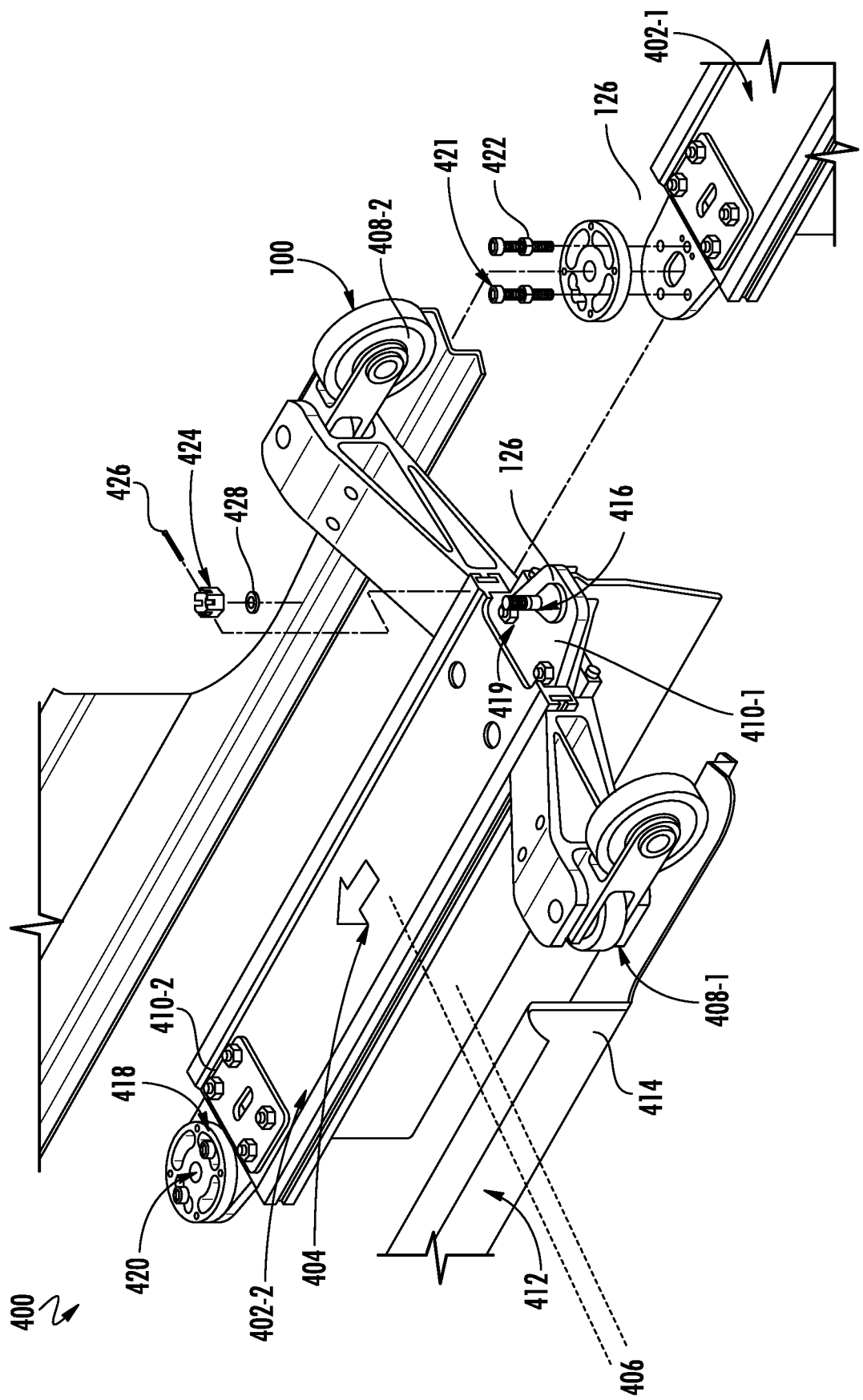
FIG. 4 illustrates an exploded partially disassembled perspective view of a coupling assembly comprising a coupling disc and a bearing unit, according to one or more exemplary embodiments.

FIG. 4 illustrates an exploded partially disassembled perspective view of the cart coupling assembly 126 of a sortation conveyor system 400, according to one or more exemplary embodiments. It may be understood that the coupling arrangement mechanism, according to various embodiments described herein, may be implemented in a material handling environment, such as the environment illustrated in FIG. 1. In accordance with various embodiments described herein, the cart coupling assembly 126, is adapted for engaging two adjacently positioned conveyor carts, such a cart 402-1 and a cart 402-2 of the sortation conveyor 102. In this regard, as illustrated, two adjacently placed carts 402-1 and 402-2 may move in any direction, such as a first direction 404 representing a direction of movement of the cart from a source location to a destination. Alternatively, or additionally, the carts 402-1 and 402-2 may move in a second direction against the first direction 404, such as from destination towards source location.

In one or more aspects, according to one or more exemplary embodiments, each of the carts 402-1 and 402-2 includes a main cart profile such as a cart frame 406, left and right wheel assemblies 408-1 and 408-2, and components of the cart coupling assembly 126. In this aspect, the cart frame 406 includes a carrier support structure having a longitudinal portion and a transverse portion. The longitudinal portion terminates at horizontally-extending front hitch plate 410-1 and rear hitch plate 410-2 and the transverse portion terminates in left and right ends. The left and right wheel assemblies 408-1 and 408-2 are attached, respectively, to the left and right ends of the transverse portion that are received for longitudinal movement, in left and right tracks of a loop sorter track 412 of a loop sortation conveyor frame bed 414. As illustrated, the cart coupling assembly 126 may include: (i) a vertically-extending bearing hub assembly 416 including a pivot pin 419 attached to one of the front and rear hitch plates 410-1 and 410-2; and (ii) the cart coupling assembly 126. The cart coupling assembly 126 further includes: (a) a coupling disc 418 attached to another of the front and rear hitch plates 410-1 and 410-2, the coupling disc 418 having a central hub opening in form of a bearing slot 420, that is adapted to receive the bearing hub assembly 416 with the pivot pin of an adjacent loop sorter cart, for instance, third cart 402-3 (not shown herein); and (b) an adjustment mechanism, including a position register screw 421 and one or more mounting pins 422 that attaches the coupling disc 418 to the other of the front and rear hitch plates 410-1 and 410-2. To this extent, each of the position register screw 412 and the one or more mounting pins 422 engages the coupling disc 418 one of the front and rear hitch plates 410-1 and 410-2 and are fixed about its engaging positions once the coupling disc 418 is engaged to any of the plates. In this regard, the bearing hub assembly 416, includes the pivot pin 419, on top of which a castle nut 424 may be mounted over a spacer ring 428, and locked by means of a carter pin 426, so that in operation, the bearing hub assembly 416 never pops out from the bearing slot 420 of the coupling disc 418. The adjustment mechanism, as illustrated herein, is responsive to a rotational adjustment of the coupling disc 418, in a selected direction, to longitudinally move the bearing slot 420 or the central hub opening of the coupling disc 418 relative to the other of the front and rear hitch plate 410-1 and 410-2. Further details of the cart coupling assembly 126 and its operation for engaging adjacent carts 402-1 and 402-2 are described in reference to FIG. 5

Figure 5:
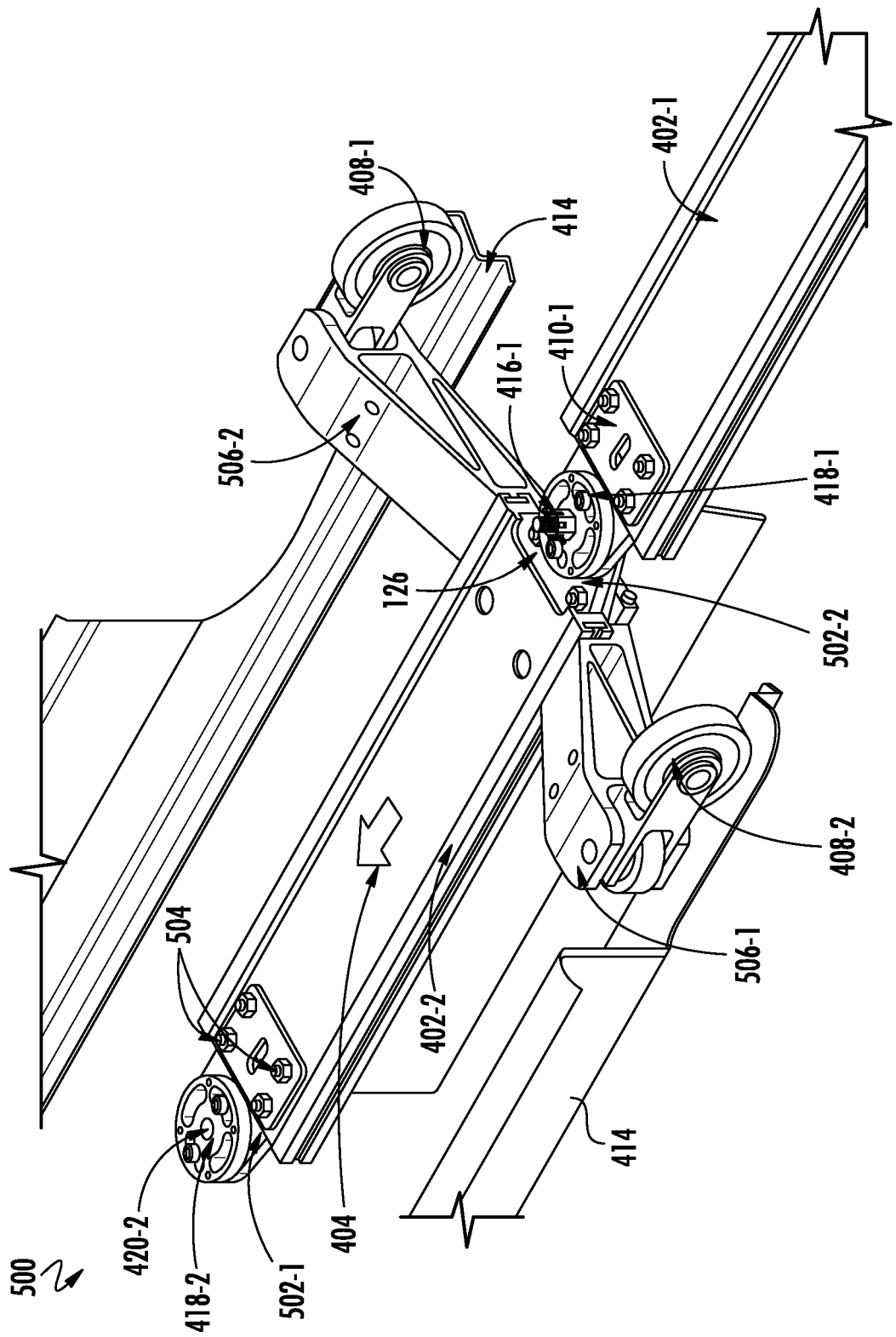
FIG. 5 illustrates an enlarged perspective view of a sortation conveyor system including a coupling assembly connecting two adjacent conveyor carts, according to one or more exemplary embodiments.

FIG. 5 illustrates an enlarged perspective view of a sortation conveyor system 500 including the cart coupling assembly 126 engaging two adjacent conveyor carts according to one or more exemplary embodiments. Illustratively, each of the carts 402-1, 402-2 comprise two ends such as a front or primal end and a rear or distal end. In this regard, the cart 402-1 on its front end comprises a front hitch plate 410-1 which is engaged by the cart coupling assembly 126 to the cart 402-2 having a rear hitch plate 502-2 on its rear end. Also, carts 402-1, 402-2 comprise rear hitch plates 410-1, 410-2 engaged to its back or rear end. Similar, to the front hitch plate 410-1, the cart 402-2 at its front end includes a front hitch plate 502-1. In this aspect, the front hitch plates 410-1 and 502-1 and/or the rear hitch plates 410-2 (not shown herein) and 502-2 may be engaged to the first cart 402-1 and the second cart 402-2 by means of various pins, such as by engagement bolts 504.

It may be understood, that along the sortation conveyor system 500, there may be multiple carts 402-1, 402-2, . . . 402-n and one or more of the multiple carts may comprise on its front ends, front hitch plates 410-1,502-1, and on its rear ends, rear hitch plates 410-2, 502-2, where the front hitch plates of a cart engages with the rear hitch plates of an adjacent cart for enabling a movement of the sortation conveyor system 500 in a sorter cart train fashion. In accordance with various embodiments illustrated herein, the adjacent carts 402-1 and 402-2 may be engaged mechanically or by any other means to each other by engaging a front end of a first cart, such as the cart 402-1, to a rear end of a second cart, such as the cart 402-2. In this regard, the front plate 410-1 of the first cart 402-1 engages with the rear hitch plate 502-2 of the second cart 402-2 respectively, via the cart coupling assembly 126 including a coupling arrangement and the bearing hub assembly 416. In this aspect, the cart coupling assembly 126 comprising the circular coupling disc 418, is mounted via mounting plates (not shown herein) on the front hitch plates 410-1, 502-1 and the bearing hub assembly 416 is mounted on the rear hitch plates 410-2, 502-2 of respective carts 402-1, 402-2 and/or the like.

In accordance with various embodiments illustrated herein for engaging the first cart 402-1 with the second cart 402-2, the cart coupling assembly 126 that is mounted on the front hitch plate 410-1 of the first cart 402-1 is configured to engage with the bearing hub assembly 416-1 that is present on the rear hitch plate 502-2 of the second cart 402-2. The cart coupling assembly 126, according to various embodiments described herein, includes a coupling disc 418-1 which is adapted to be engaged on a mounting plate of complimentary size over the front hitch plate 410-1 of the first cart 402-1. Similarly, for engaging the cart 402-2 with a next cart (not shown) of the sortation conveyor 102, a coupling disc 418-2 on the front hitch plate 502-1 of the cart 402-2 is provided which is adapted to be engaged with a rear hitch plate (not shown) of a subsequently next cart.

In accordance with various embodiments described herein, the coupling discs 418-1 or 418-2 are rotatable around its center. Each of the coupling discs 418-1 or 418-2, comprises bearing slots 420-2 and 420-1 (not visible in figure as a hitch pin of the bearing hub assembly 416 passes through the bearing slot) to engage the bearing hub assemblies 416-1, 416-2 and so on of respective adjacent carts. In this aspect, as illustrated, the coupling disc 418-2 of the cart 402-2, comprises the bearing slot 420-2 for engaging the bearing hub assembly 416 that may be mounted at the rear end or rear hitch plate of the next cart 402-3. Alternatively, or additionally, two adjacent carts 402-1 and 402-2 may be engaged to each other based on engagement of the bearing hub assembly 416-1 on the rear-hitch plate 502-2 of the cart 402-2 into the bearing slot 420-1 of the coupling disc 418-1 on the front hitch plate 410-1 of the cart 402-1. Further details pertaining to structure, components, and operations of the cart coupling assembly including the coupling discs 418-1, 418-2 and the bearing hub assembly 416-1 are provided at least with respect to FIGS. 6 and 7 respectively.

The coupling arrangement mechanism described herein and as illustrated in FIG. 5, provides for engagement of two adjacent carts, such as the first cart 402-1 and 402-2 while the multiple carts of the sortation conveyor system, such as a sorter train, moves over the conveyor frame bed 414. Illustratively, in accordance with some exemplary embodiments, one or more of the carts, for instance, the first cart 402-1 or the second cart 402-2, may comprise two support arms 506-1 and 506-2 that may be clamped on a main profile, such as the cart main profile 206, as illustrated in FIG. 2. The support arms 506-1 and 506-2 may extend outwardly opposite to each other towards the conveyor frame bed 414 such as, a conveyor frame or a sorter frame. In this regard, in an example embodiment, the support arms 506-1 and 506-2 may be foldable about the cart main profile 206, such as in a vertical direction for picking out the cart 402-1 or 402-2 out from the sortation conveyor system 500 and disengaging the carts 402-1 or 402-2 from the conveyor frame bed 414. Illustratively, each of the support arms 506-1 and 506-2 may be engageable to cart wheel assemblies 408-1 and 408-2, respectively, that enables movement of the carts 402-1 and 402-2 along the conveyor frame bed 414.

Figure 6:
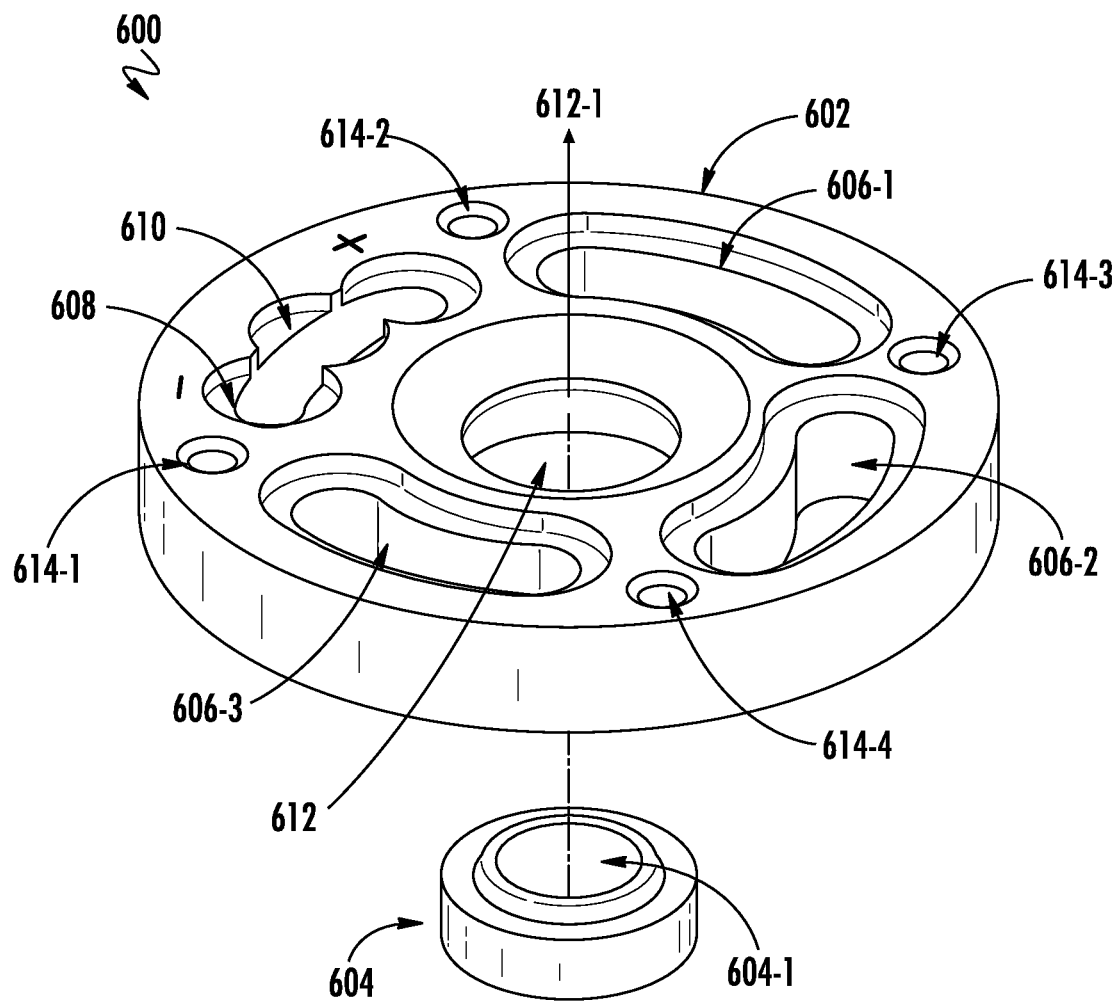
FIG. 6 illustrates a perspective view of a cart coupling assembly comprising a coupling disc and a bearing unit, according to one of more exemplary embodiments.

FIG. 6 illustrates a perspective view of a coupling arrangement mechanism, according to various embodiments of the present subject matter. In an aspect, a cart coupling assembly 600 facilitates engagement of adjacent carts in a sortation conveyor system such as, a loop sorter or a tilt-tray sorter. For purpose of understanding and clarity, various structural portions of coupling disc assembly 600 and its operational aspects in a material handling environment, are described based on referring to FIGS. 4 and 5 respectively. However, this does not limit the operational aspects to which the cart coupling assembly 600 is capable of, i.e. the cart coupling assembly 600, may be used in other application areas, as well, for various purposes. In accordance with various embodiments described herein, along with engaging two carts together, the cart coupling assembly also facilitates for adjustment of a length of a cart, such as carts 402-1, 402-2 as illustrated in FIGS. 4 and 5, thereby adjusting a distance between the two adjacent carts, for instance, the carts 402-1 and 402-2.

As illustrated, the cart coupling assembly 600 includes: a coupling disc 602, a bearing unit 604, and a bearing hub arrangement (not shown herein). As illustrated, a structure of the coupling disc includes, a bearing slot 612 adapted to hold the bearing unit 604. In this regard, the bearing slot 612 is located circumferentially at a center of the coupling disc 602. To this extent, the bearing unit 604 may be engaged into the bearing slot 612 by means of one or more markings 604-1 on the bearing unit, which on positioning the bearing unit 604 within the bearing slot, mechanically fits the bearing unit 604 into the bearing slot 612 by means of complimentary markings 612-1 that may be present inside on a lateral surface of the bearing slot 612. A cavity, for instance, but not limited to, a circular shaped cavity as defined by the bearing slot 612 and the bearing unit 604 is such that, on engaging the two adjacent carts together, the pivot pin 419 of the bearing hub assembly 416 on a first cart passes through a cavity of the bearing unit 604 and thereby, through the bearing slot 612 of the coupling disc 602, thereby engaging the two adjacent carts together. Illustratively, the bearing unit 604 may be a spherical bearing that may be configured to be seated in the recess of the bearing slot 612.

The structure of the coupling disc 602 further includes various slots, illustratively, one or more mounting slots 606-1, 606-2, and 606-3, and a control slot 608, as illustrated in FIG. 6. In this regard, each one of respective mounting slots 606-1, 606-2, and 606-3 and the control slot 608, are adapted to receive, the one or more mounting pins 422 and the position register screw 421 respectively, when the coupling disc 600 is mounted on an end of a cart, for instance, on the front hitch plate 410-1 of a cart as illustrated in FIGS. 4 and 5 respectively. Thus, as the coupling disc 602 is positioned on the front hitch plate 410-1 of the cart 402-1, the set of mounting pins 422 received into respective mounting slots 606-1, 606-2, and 606-3, thereby temporarily engaging the coupling disc 602 on the front hitch plate 410-1. Further, as the coupling disc 602 is positioned on the front hitch plate 410-1, the position register screw 421, which is of a size different than each of the one or more mounting pins 422, is received in the control slot 608.

In accordance with various embodiments described herein, each of the mounting slots 606-1, 606-2, and 606-3 defines a mounting slot cavity and the control slot 608 defines a control slot cavity along which the mounting pins 422 and the position register screw 421 slides, upon the rotation of the coupling disc 602. The coupling 602 disc further includes, multiple spanner holes 614-1, 614-2, 614-3, 614-4 that may be used for rotating the coupling disc 602 about its center by means of any conventionally known spanner tool. In this aspect, a spanner wrench may be used to engaged into the one or more spanner holes, such as 614-1, 614-2, 614-3, so as to adjust a position of the coupling disc 602 when the coupling disc is engaged on a hitch plate of a cart. According to some embodiments, to rotate the coupling disc 602, the mounting pins 422 may be manually or mechanically loosened, unmounted, unscrewed or unfastened, from its engagement with the front hitch plates 410-1 or 502-1, so as to allow the coupling disc 602 to be rotated about its center. To this extent, upon engagement of the coupling disc 602 on the front hitch plate 410-1, as the coupling disc 602 rotates, the control slot 608 and each of the mounting slots 606-1, 606-2, and 606-3 slide on each respective one of the position register screw 421 and the set of mounting pins 422. In this regard, the structure defining cavity of the mounting slots 606-1, 606-2, and 606-3 and the control slot 608, is such that, as the mounting slot cavities and the control slot cavity of the coupling disc 602 slid ably moves with respect to respective mounting pins 422 and the position register screw 421 moves inside the respective slots, a translational movement of the coupling disc 602 about the bearing unit 604 occurs. In some embodiments, when two adjacent carts are engaged together by means of the coupling disc 602, this translational movement of the coupling disc 602 about the bearing unit 604 causes a change in gap between the two engaged carts. To this extent, a structure of the control slot 608 and each of the mounting slots 606-1, 606-2, and 606-3 respectively, facilitates, a continual linear translation of a center of rotation about the bearing unit 604 of the coupling disc 602, as the coupling disc 602 is rotated continually. In this regard, cavities (i.e. the control slot cavity and the mounting slot cavity) defined by each of the control slot 608 and the one or more mounting slots 606-1, 606-2, and 606-3 respectively, represents circular arcs shaped structure that controls a movement of an instantaneous center of the coupling disc 600 as the coupling disc 600 is rotated about the mounting pins 422. In this regard, the circular arc shaped structure of these cavities is such that, a radius of these control arcs with respect to a center of the bearing unit 604 remains constant, in an instance, when the coupling disc 602 is rotated about the mounting pins 422 and the circular arcs only allow linear translation of a center of the bearing unit 604, as the mounting pins 422 slides within the mounting slot cavities defined by the one or more mounting slots 606-1, 606-2, and 606-3 respectively.

Accordingly, as the coupling disc 602 rotates, rotational motion of the coupling disc 602 is continually translated into the linear motion of the coupling disc 602 over the front hitch plate 410-1 about a slot (not shown herein) of the front hitch plate 410-1, over which the bearing slot 612 of the coupling disc 602 is co-axially positioned while engaging the coupling disc 602 on the cart 402-1 (refer to FIG. 4). The coupling disc 602, in accordance with various embodiments described herein, may be rotated in a first direction or a second direction, for instance, a clockwise or counterclockwise direction, about its continually translating center of rotation about the bearing unit 604.

Illustratively, in accordance with various embodiments as described herein, the control slot 608 includes one or more position registers 610, defined along the control slot cavity that is defined by the control slot 608. To this extent, structure of the one or more position registers 610 is such that, in an instance, when the position register screw 421 is received in the control slot cavity of the control slot 608 and the coupling disc 602 is rotated, the one or more position registers 610: (a) engages and lock, the position register screw 421 to restrict a sliding e movement of the control slot cavity defined by the control slot relative to the position register screw 412, along the control slot cavity in one direction (a first direction), and (b) allows sliding movement of the control slot cavity relative to the position register screw 421 in another direction (a second direction) opposite to the one direction.

Accordingly, on rotating the coupling disc 602, as the control slot 608 and mounting slots 606-1, 606-2, and 606-3 slides on each respective one of the position register screw 421 and the set of mounting pins 422, the one or more position registers 610 restricts a sliding movement of the control slot cavity relative to the position register screw 421 in a direction, for instance, against the direction of rotation (clockwise or counter-clockwise) of the coupling disc 602. For example, if the coupling disc 602 is rotated in a clockwise direction, one or more the position registers 610 restricts the movement of the control slot cavity relative to the position register screw 421 in a counter-clockwise direction, thereby allowing sliding of the position register screw 421 along the control slot cavity of the control slot 608 in one direction only, at an instance of time. Further, one or more the position registers 610 on the coupling disc 602 are also adapted to lock the position register screw 421, as in, when, upon sliding movement of the control slot cavity as the coupling disc rotates, the position register screw 421 is completely recessed into a portion representative of a position register of the control slot cavity of the control slot 608.

In accordance with an embodiment, as the coupling disc 602 is rotated, the one or more position registers 610 are configured to: (a) restrict a sliding movement of the control slot cavity relative to the position register screw 421 in the first direction, along the control slot cavity, as in when the rotation is in the second direction and allow the sliding movement of the control slot cavity of the control slot cavity relative to the position register screw 421 in the second direction. In this regard, in an embodiment, the first direction may correspond to a counterclockwise direction and the second direction may correspond to a clockwise direction. Alternatively, in some embodiments, the first direction may correspond to a clockwise direction and the second direction may correspond to a counterclockwise direction. Further, the one or more position registers 610 are configured to lock the position register screw 421 in one of the one or more position registers 610, upon the movement of the control slot cavity relative to the position register screw 421 along the control slot cavity of the control slot 608.

According to some embodiments, in an instance, when the coupling disc 602 is rotated in the clockwise direction, the control slot 608 and each of the mounting slots 606-1, 606-2, and 606-3 slides on each respective one of the position register screw 421 and the set of mounting pins 422 respectively, to produce translational movement of the bearing to change the gap between the first and second carts in a downstream direction, (for instance, a direction opposite to the direction 115 as illustrated in FIG. 1) of the sortation conveyor 102. In alternate embodiments, in an instance, when the coupling disc is rotated in the counter-clockwise direction, the control slot and each of the mounting slots slide on each respective one of the position register screw 421 and the set of mounting pins respectively to produce translational movement of the bearing to change the gap between the first and second carts in an upstream direction, (for instance the direction 115 as illustrated in FIG. 1), of the sortation conveyor system.

In this regard, in accordance with said embodiments, as rotation of the coupling disc 602 is translated into a linear motion, the coupling disc 602 starts displacing over a front hitch plate of a cart, such as front hitch plate 410-1 of the cart 402-1. As the coupling disc 602 couples the two adjacent carts together, any displacement in the coupling disc 602 over an edge of the cart causes variation in a distance between the two adjacent carts, thereby providing adjustments for any gaps formed between adjacent carts. Further, details related to rotation of the coupling disc 602 and its translation into linear motion to facilitate adjustments in distances between the front hitch plate 410-1 and the rear hitch plate 502-2 are provided in description of FIGS. 7 and 8 respectively.

Figure 7:
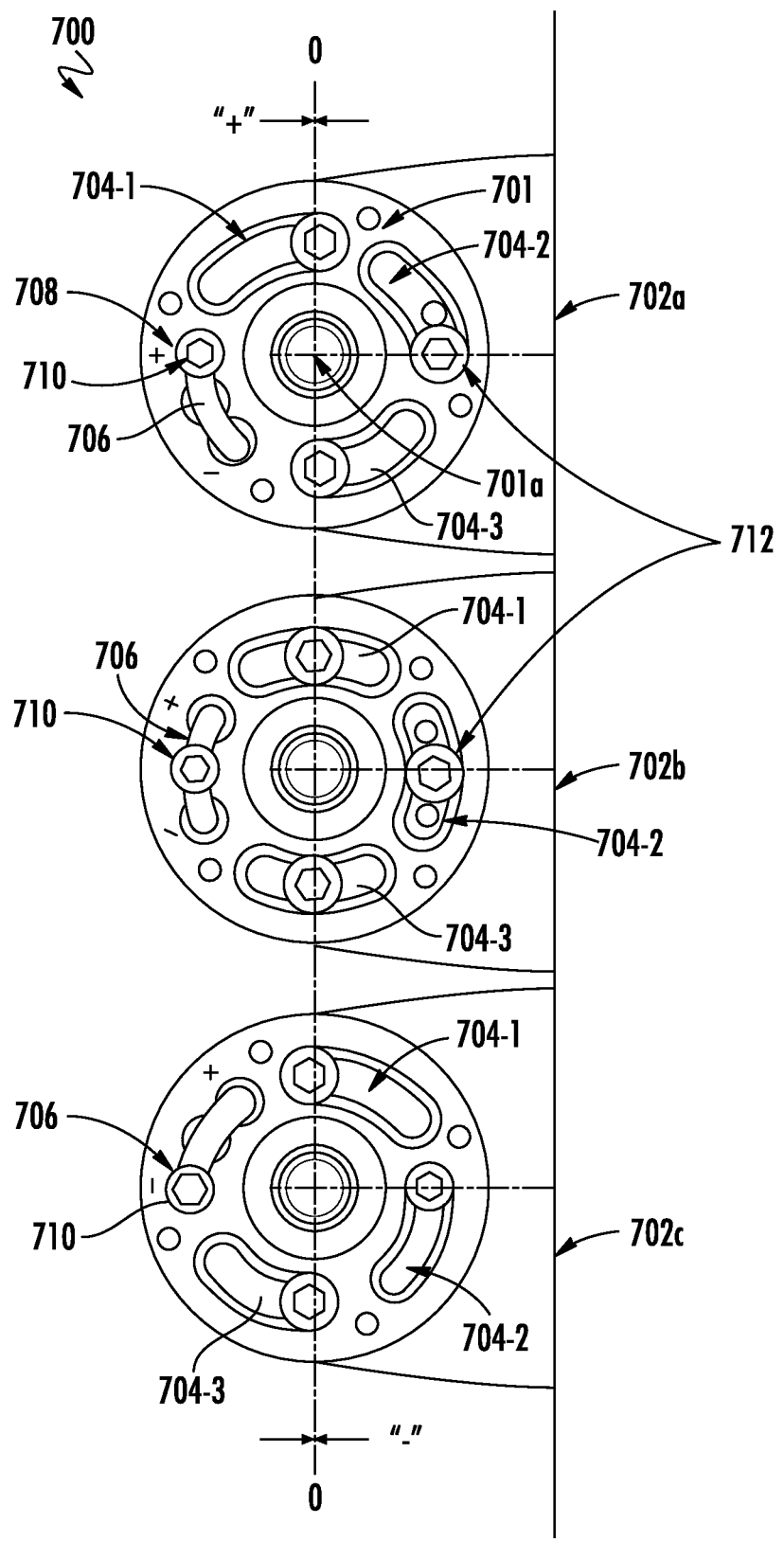
FIG. 7 illustrates, a cross-sectional view illustrating operations of a cart coupling assembly for adjusting distance between two adjacent carts on a sortation conveyor, according to one or more embodiments.

FIG. 7 illustrates, a sectional view of operations of a cart coupling assembly 700 for adjusting distance between two adjacent carts on a sortation conveyor, according to one or more embodiments described herein. As illustrated, the cart coupling assembly 700 includes a coupling disc 701 that may be configured to be rotated in a clockwise or counter-clockwise direction about its center 701a. In an aspect, the coupling disc 701 includes three shaped mounting slots such as, mounting slots 704-1, 704-2, and 704-3 respectively, for mounting the coupling disc 701 on a hitch plate (like the front hitch plate 410-1 of a cart). Further, the coupling disc 701 includes an control slot 706, defining one or more position registers 708 (similar to the one or more position registers 610 illustrated in FIG. 6) that are adapted to hold a position register screw 710, in three different positions respectively. As illustrated, 702a, 702b, 702c represent different positions of the position register screw 710 in the control slot 706 of the coupling disc 701 that may be achieved upon rotation of the coupling disc 701 about its central axis. In this regard, 702b represents a no-rotation or nominal position of the coupling disc 701; 702a represents a first state or position of the coupling disc 701 upon rotation in a clockwise direction about its center; and 702c represents a third state or position of the coupling disc 701 upon rotation in the counterclockwise direction about its center. In accordance with various embodiments described herein, rotation of the coupling disc 701 causes: (a) a sliding movement of the mounting slot cavities of respective mounting slots 704-1, 704-2, and 704-3 relative to mounting pins 712 along the mounting slots 704-1, 704-2, and 704-3 respectively and (b) sliding movement of a control slot cavity relative to the position register screw 710 along the control slot cavity of the control slot 706 having the one or more position registers 708.

As illustrated in FIG. 7, the coupling disc 701 comprises three such mounting slots 704-1, 704-2, and 704-3 which receives respective mounting pins 712 and one control slot 706 which receives the respective position register screw 710. Alternatively, according to another embodiment, the coupling disc 701 may have any number of mounting slots and corresponding mounting pins and one or more control slots with corresponding position register screws.

According to various example embodiments described herein, the mounting slots 704-1, 704-2, and 704-3 may be similar in design to the mounting slots 606-1, 606-2, and 606-3 as illustrated and described in reference to FIG. 6. Similarly, the control slot 706 may be similar in design to the control slot 608 illustrated and described with reference to FIG. 6.

Referring to the first state 702a of the coupling disc 701, as illustrated, the position register screw 710 is engaged to an extreme end or a last position register in the control slot cavity of the control slot 706. This represents a maximum adjustment or increase in a length of a cart that is possible by means of rotating the coupling disc 701 mounted on a front end of a cart. Illustratively, "+" as illustrated on the first state 702a of the coupling disc 701 represents an increase in a length of the cart in a first direction, i.e. towards a forward direction of movement of the sortation conveyor 102. In this regard, for increasing a length of a cart or for adjusting gaps between two adjacent carriers in the first direction of movement of the sortation conveyor, the coupling disc 701 may be rotated in a clockwise direction until the coupling disc 701 reaches the first state 702a.

Referring to the third state 702c of the coupling disc 701, as illustrated, the position register screw 710 is engaged to an end or a first position register, in the control slot cavity of the control slot 706. This represents a maximum adjustment or decrease in a length of a cart that is possible by means of rotating the coupling disc 701 mounted on a front end of a cart. Alternatively, or additionally, the third state 702c also represents a maximum adjustment in length of a cart in a second direction, i.e. against the first direction of movement of the sortation conveyor 102. Illustratively, in the first state 702*a* of the coupling disc 701 a decrease (represented as "−") in a length of the cart in the first direction (e.g., towards direction of movement of the sortation conveyor) or an increase (represented as "+") in length of the cart in the second direction (e.g., against the first direction of movement of the sortation conveyor). In this regard, decreasing a length of a cart or for adjusting gaps between two adjacent carriers in the second direction of movement of the sortation conveyor, the coupling disc 701 may be rotated in the counterclockwise direction until the coupling disc 701 reaches the third state 702*c*.

Similarly, the second state 702*b* represents a state or position of the coupling disc 701 achieved without any rotation of the coupling disc 701 (e.g., a nominal state). For instance, upon installation of the coupling disc on a cart in the sortation conveyor system, the coupling disc 701 may be in the second state 702*b*. As illustrated in the state 702*b*, the position register screw 710 is engaged on a position register at a middle of the control slot 706. Illustratively, from a nominal state, i.e. the second state 702*b* of the coupling disc 701, the coupling disc 701 may be rotated in a clockwise direction to reach the first state 702*a* or may be rotated in a counterclockwise direction to reach the third state 702*c* of the coupling disc 701. Operations related to adjustment of gaps between two adjacent carts by increasing or decreasing a length of the cart are described in more details with respect to description of FIG. 8

FIG. 8 illustrates a method 800 for adjusting length of a cart assembly (to adjust gaps between adjacent carts), in a sortation conveyor system. It may be understood that various steps of the method 800 are described herein with respect to the cart coupling assembly and its operations illustrated in FIGS. 3-7. In one or more embodiments, method 800 includes engaging a first cart, such as the first cart 402-1, with a second cart, such as the second cart 402-2, via a cart coupling assembly 126 (block 802). The cart coupling assembly 126, as described before, herein, includes the coupling disc 602 having the control slot 608, a bearing slot 612, and one or more mounting slots 606-1, 606-2, and 606-3. In this regard, during installation of carts on a sortation conveyor, the first cart 402-1 may be placed adjacent to the second cart 402-2. Engaging the first carts to the second cart may further include engaging, a bearing hub assembly, like bearing hub assembly 416, on a rear end of the second cart 402-2 into a bearing slot, such as bearing slot 612, of a coupling disc, such as the coupling disc 418, on a front end of the first cart 402-1. Illustratively, in some embodiments, engaging the first cart 402-1 with the second cart 402-2 may further include fixing or fastening a screw or a nut bolt unit with a safety pin over a top of the bearing hub assembly engaged with the coupling disc, which locks the bearing hub assembly 416 with the coupling disc 418.

Upon engaging the first cart with the second cart, method 800 includes, rotating the coupling disc, such as the coupling disc 418 in any of a clock-wise direction or counterclockwise direction relative to center axis of the coupling disc 418, for instance, about a bearing slot, such as the bearing slot 610 or 420 (block 804). Rotation of the coupling disc 418 causes, movement in a sliding fashion of the control slot cavity of the control slot 608 relative to: (a) a position register screw, such as the position register screw 421 or 710, along the control slot cavity of the control slot 608 and movement in a sliding fashion of the mounting slot cavity of the one or more mounting slots 606-1, 606-2, and 606-3 respectively, relative to (b) a mounting pin, for instance, the mounting pins 422 along mounting slot cavity of one or more mounting slots 606-1, 606-2, and 606-3 respectively, in a second direction. Illustratively, rotating of the coupling disc 418 may be performed upon loosening or un-fastening of mounting pins on the coupling disc, such as mounting pins 422. As described previously, mounting pins 422 maintain a tight engagement of the coupling disc over the front plate of a cart. In this regard, loosening the mounting pins 422, allows rotation of the coupling disc about its center. Accordingly, in some examples, when any gaps are formed between carts in the sortation conveyor system, an operator may manually un-fasten the mounting pins and thereafter rotates the coupling disc using a spanner tool via one or more spanner holes, such as 614-1, 614-2, 614-3 provided on the coupling disc. In this aspect, a spanner wrench may be used to engaged with the one or more spanner holes, such as 614-1, 614-2, 614-3, so as to adjust a position of the coupling disc 602 when the coupling disc is engaged on a hitch plate such as, the front hitch plate 410-1 of a cart. As described earlier, rotation of the coupling disc causes displacement of the coupling disc over a front plate of a cart, thereby adjusting a length of the cart to overcome any such gaps.

Upon rotating the coupling disc, method 800 includes, pausing the rotation of the coupling disc 418, based on a locking of the position register screw 421 or 710 by the position register 708 (block 806). In this regard, as described regarding block 804, the rotation is continued in the clockwise or counterclockwise direction which causes the position register screw 421 or 710 to slide inside the control slot cavity of the control slot 608, until, the position register 708 restricts any further sliding movement of the control slot cavity relative to the position register screw 710 in the control slot cavity, thereby causing the position register screw 710 to lock in the position register 708. As described earlier in reference to states, for instance, a first state 702*a*, a second state 702*b*, and a third state 702*c* of the coupling disc 701 in FIG. 7, locking the position register screw 710 by the position register 708, also restricts sliding movement of the control slot cavity relative to the position register screw 710 in a first direction opposite to the second direction. Thus, to overcome any gaps formed between the carts, the operator may continue rotating the coupling disc, such that the rotational motion of the coupling disc is translated into linear displacement of the coupling disc over a cart and thereby providing an infinitely variable (+/−) adjustment for increasing or decreasing length of the cart. Accordingly depending on a determined adjustment in length of cart and a position of the position register screw 710 relative to the position register along the control slot cavity of the control slot 608, the operator can pause the rotation of the coupling disc as soon as the position register screw 710 locks in the position register 708. In this regard, based on sliding of the control slot cavity and the mounting slot cavity relative to: (a) the position register screw 421 or 710 in the control slot 608 and (b) the one or more mounting pins 422 in the mounting slots 606-1, 606-2, and 606-3 respectively, a continually translation of a center of rotation of the bearing unit 604 of the coupling disc 418 or 602, occurs, thereby sliding the coupling disc 602 over an end of the cart and resulting in the adjustment of distance or gaps formed between the cart and an adjacent cart in one direction at an instance of time.

According to an embodiment, the method 800 includes mounting the cart coupling assembly 126 on the first cart, for instance the cart 402-1 via the one or more mounting pins 422 configured to be received in the one or more mounting slots 606-1, 606-2, and 606-3 respectively, of the coupling disc 606. In this aspect, the method also includes, engaging the bearing hub assembly 416-1 on a rear end of the second cart 402-2 in the bearing slot 418-1 of the coupling disc 602 that is mounted on a front end of the first cart 402-1.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A cart coupling assembly, comprising:
    a coupling disc configured to couple to an adjacent cart, wherein the coupling disc comprises:
        a bearing slot adapted to hold a bearing, wherein the bearing slot is located at a center of the coupling disc, wherein the bearing slot is configured to engage, with a bearing hub assembly of the adjacent cart;
        a mounting slot through which a bolt can be fastened to the adjacent cart; and
        a control slot with one or more position registers defined along a control slot cavity of the control slot, the one or more position registers configured to one of restrict or allow a sliding movement of the control slot cavity, while the coupling disc rotates relative to the bearing slot, and wherein in response to rotation of the coupling disc, a gap distance between the cart coupling assembly and the adjacent cart varies without transverse movement of the coupling disc.

2. The cart coupling assembly of claim 1, further comprising a plurality of mounting slots that define a plurality of mounting slot cavities along which a set of mounting pins slide, upon the rotation of the coupling disc.

3. The cart coupling assembly of claim 2 wherein, the control slot cavity and the mounting slot cavities defined by a structure of the control slot and each of the mounting slots respectively, facilitates a continual linear translation of a center of rotation about the bearing of the coupling disc, as the coupling disc is rotated causing the control slot and each of the mounting slots slide on each respective one of the position register screw and the set of mounting pins.

4. The cart coupling assembly of claim 2, wherein, in an instance, when the coupling disc is rotated in a clockwise direction, the control slot and each of the mounting slots slide on each respective one of the position register screw and the set of mounting pins respectively to produce translational movement of the bearing to change the gap between a first and a second carts in a downstream direction of a sortation conveyor system, and in an instance, when the coupling disc is rotated in a counter-clockwise direction, the control slot and each of the mounting slots slide on each respective one of the position register screw and the set of mounting pins respectively to produce translational movement of the bearing to change the gap between the first and second carts in an upstream direction of the sortation conveyor system.

5. The cart coupling assembly of claim 4, wherein a rotational motion of the coupling disc is translated to linear motion based on a continual translation of a center of rotation of the coupling disc, to change a gap between the first and second carts, thereby, causing displacement of the coupling disc along a front end of the first cart.

6. The cart coupling assembly of claim 4, wherein the coupling disc is mounted on a front end of the first cart and the bearing hub assembly is mounted on a distal end of the second cart and wherein the coupling disc engages to the bearing hub assembly, via the bearing slot, for coupling the first cart adjacent to the second cart.

7. The cart coupling assembly of claim 2, wherein a size of the position register screw is different from the size of each mounting pin.

8. The cart coupling assembly of claim 2, wherein the plurality of mounting slots includes a first mounting slot, a second mounting slot, and a third mounting slot, that are used to mount the coupling disc via the set of mounting pins on a front plate attached at the end of a first cart.

9. The cart coupling assembly of claim 1, wherein the one or more position registers of the control slot are configured to:
    restrict the sliding movement of the control slot cavity relative to position register screw in a first direction based on the rotation of the coupling disc along the control slot cavity of the control slot in a second direction, wherein, the first direction corresponds to a counter-clockwise direction, in an instance, when the second direction is a clockwise direction and wherein the first direction corresponds to a clockwise direction, in an instance, when the second direction is a counter-clockwise direction of rotation of the coupling disc; and
    lock the position register screw in one of the one or more position registers, upon the sliding movement of the control slot cavity relative to the position register screw along the control slot cavity of the control slot.

10. The cart coupling assembly of claim 1, wherein the coupling disc comprises at least two pairs of spanner holes positioned opposite to each other, wherein the pairs of spanner holes are configured to engage with a spanner wrench for adjusting a position of the coupling disc on a cart.

11. A coupling disc configured to couple to an adjacent cart, wherein the coupling disc comprises:
    a bearing slot adapted to hold a bearing, wherein the bearing slot is located at a center of the coupling disc, wherein the bearing slot is configured to engage, with a bearing hub assembly of the adjacent cart;
a mounting slot through which a bolt can be fastened to the adjacent cart; and
a control slot with one or more position registers defined along a control slot cavity of the control slot, the one or more position registers configured to one of restrict or allow a sliding movement of the control slot cavity, while the coupling disc rotates relative to the bearing slot, and wherein in response to rotation of the coupling disc, a gap distance between a cart coupling assembly and the adjacent cart varies without transverse movement of the coupling disc.

12. The coupling disc of claim 11, wherein the position register of the coupling disc is configured to:
restrict a sliding movement of the control slot cavity relative to the position register screw in a first direction based on the rotation of the coupling disc along the control slot cavity of the control slot in a second direction, wherein, the first direction corresponds to a counter-clockwise direction, in an instance, when the second direction is a clockwise direction and wherein the first direction corresponds to a clockwise direction, in an instance, when the second direction is a counter-clockwise direction of rotation of the coupling disc; and
lock the position register screw in one of the one or more position registers, upon the sliding movement of the control slot cavity relative to the position register screw along the control slot cavity of the control slot.

13. The coupling disc of claim 11, wherein,
in an instance, when the coupling disc is rotated in a clockwise direction, the control slot slide on each respective one of the position register screw to produce translational movement of the bearing to change the gap between a first and second carts in a downstream direction, and
in an instance, when the coupling disc is rotated in a counter-clockwise direction, the control slot on each respective one of the position register screw produce translational movement of the bearing to change the gap between the first and second carts in an upstream direction.

14. The coupling disc of claim 11, wherein the bearing hub assembly comprises a castle nut, a spacer ring, and a carter pin and wherein the bearing hub assembly is on an end of a rear hitch plate and is configured to engage in the bearing slot of the cart coupling assembly.

15. The coupling disc of claim 11, wherein the coupling disc comprises plurality of mounting slots, wherein each of the mounting slots receive one of the respective of mounting pins that are engaged on a front hitch plate of the first cart, as the bearing slot of the coupling disc receives the bearing hub assembly on a rear hitch plate of a second cart, thereby engaging the first cart with the second cart.

16. A method for operating a cart assembly in a conveyor system, the method comprising:
engaging, a first cart of the cart assembly with a second cart of the cart assembly, via a cart coupling assembly, wherein the cart coupling assembly comprises a coupling disc having a control slot with at least one position register, a bearing slot configured to hold a bearing that engages a bearing hub assembly on an end of the second cart, and one or more mounting slots through which a bolt can be fastened to the second cart;
rotating, the coupling disc with respect to the first cart and about a center axis of the coupling disc relative to the bearing slot, wherein the rotation of the coupling disc causes a sliding movement of a control slot cavity relative to a position register screw along a circular control slot cavity of the control slot; and
pausing, the rotation of the coupling disc, based on a locking of the position register screw, by the at least one position register as the control slot cavity slidably moves relative to the position register screw along the control slot cavity, wherein the position register is configured to lock the position register screw to restrict a sliding movement of the control slot cavity relative to the position register screw, thereby restricting the rotation of the coupling disc.

17. The method of claim 16, wherein a rotation of the coupling disc in a clockwise direction is to increase a length of the first cart in a direction of movement of the conveyor system and wherein the rotation of the coupling disc in a counterclockwise direction is to increase the length of the second cart in a direction opposite to the direction of movement of the conveyor system.

18. The method of claim 16, comprising, mounting the cart coupling assembly on the first cart via a set of mounting pins configured to be received in the one or more mounting slots respectively, of the coupling disc.

19. The method of claim 16, further comprising engaging a bearing hub assembly on a rear end of the second cart in the bearing slot of the coupling disc that is mounted on a front end of the first cart.

20. The method of claim 16 wherein, the circular control slot cavity and a mounting slot cavity defined by a structure of the control slot and each of the mounting slots respectively, facilitates a continual linear translation of a center of rotation about the bearing of the coupling disc as the coupling disc is rotated causing the control slot and each of the mounting slots slide on each respective one of the position register screw and a set of mounting pins.

* * * * *